Jan. 4, 1938.     C. L. HOLM     2,104,461
AUTOMOBILE FUEL TANK
Filed May 16, 1936
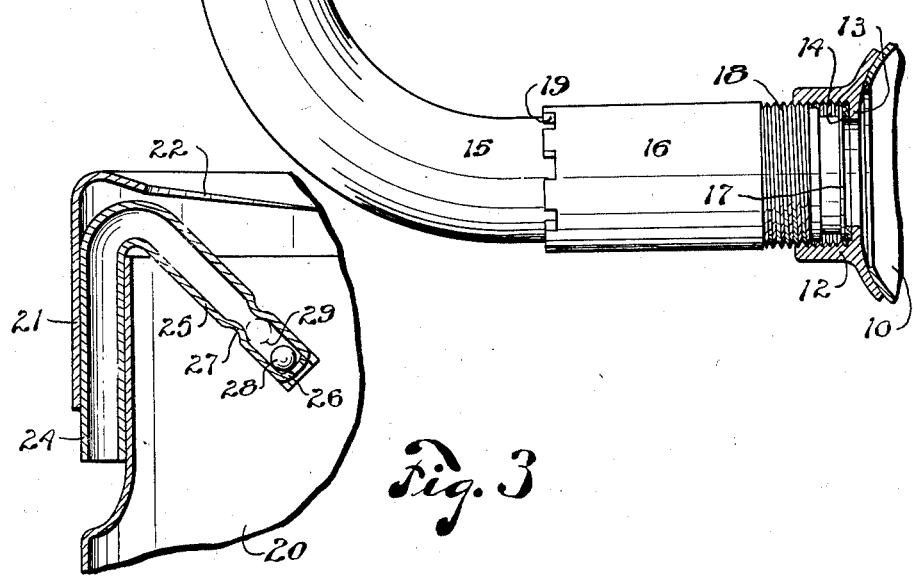
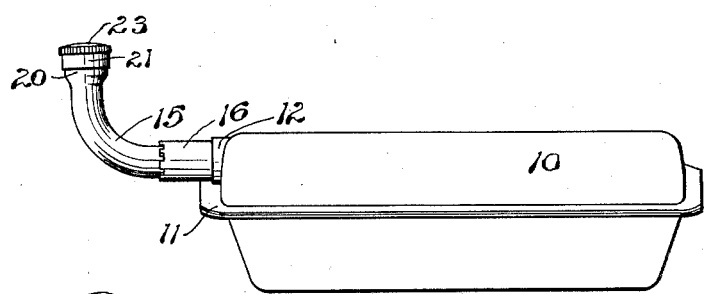
INVENTOR.
Charles L. Holm
BY
ATTORNEY.

Patented Jan. 4, 1938

2,104,461

UNITED STATES PATENT OFFICE 2,104,461

AUTOMOBILE FUEL TANK

Charles L. Holm, Dearborn, Mich., assignor to Ford Motor Company, Dearborn, Mich., a corporation of Delaware Application May 16, 1936, Serial No. 80,093

3 Claims. (Cl. 220—44)

The object of my invention is to provide an automobile fuel tank for use in streamlined automobile bodies. It is customary in modern automobiles to place the gasoline tank between the frame side members at the rear of the car and to extend a filler tube or neck outwardly and upwardly through one of the rear fenders of the vehicle for filling the tank. The body usually extends a considerable distance laterally from each side of the frame side members so that the filler neck must extend horizontally a substantial distance beyond the end of the tank. The cap which closes the outer end of the filler neck has always been provided with an air vent therein to allow air to enter the tank as the fuel is used by the engine. The disadvantage of this construction is that when the vehicle rounds a curve such that the filler neck is on the side of the car which forms the outside of the curve, the fuel is thrown centrifugally through the filler neck and is forced outwardly through the air vent in the cap. The fuel lost in this way is not appreciable. However, this fuel runs down over the fenders and collects dust, thus destroying the neat appearance of the car.

Specifically, the object of this invention is to provide a filler neck for use with the aforementioned type of automobile, which filler neck has an air vent therein which allows air to enter the tank to compensate for the fuel drawn therefrom, but which air vent will automatically close upon a centrifugal force being generated sufficient to cause the fuel to rise in the filler tube.

With these and other objects in view, my invention consists in the arrangement, construction and combination of the various parts of my improved device, as described in the specification, claimed in my claims, and illustrated in the accompanying drawing, in which:

Figure 1 shows a side elevation of my improved fuel tank and filler neck.

Figure 2 shows a side elevation of my improved filler neck, the upper portion being broken away to better illustrate the construction, and Figure 3 is an enlarged fragmentary sectional view of my improved check valve.

Referring to the accompanying drawing, I have used the reference numeral 10 to indicate a sheet metal fuel tank, which tank is formed from two drawn sheet metal stampings which form the lower and upper half of the tank, respectively. These stampings are each provided with flanges 11 which are seam welded together to form the completed tank. Suitable baffle plates, not shown in the drawing, are secured in the bottom half of the tank.

At one end of the tank 10 a horizontally extending threaded flange 12 is brazed thereto, the axis of the flange extending horizontally. A gasket seat 13 is formed in the flange 12 on which an annular gasket 14 is fitted. I have provided a filler neck 15 which is formed of seamless steel tubing in the shape of a right angle elbow. A tubular spanner nut 16 is inserted over the horizontal end of the filler neck 15 and an outwardly extending annular flange 17 is turned on this end of the filler neck tube. The flange 17 is adapted to abut against the gasket 14 when the nut 16 is screwed into the flange 12. The nut 16 is provided with conventional threads 18 on one end and suitable spanner slots 19 on the other end, whereby it may be conveniently threaded into position to secure the filler neck to the tank.

It will be noted that the upper end of the neck 15 is expanded at 20 and the sleeve 21 is pressed down over this expanded end and brazed thereto to form a fluid-tight joint. The upper end of the sleeve 21 is provided with a turned-in edge, which edge is provided with a pair of cam faces 22 which coact with a suitable cap 23 to form a bayonet-type lock which secures the cap in position. The cap 23 forms no part of my invention, as any detachable cap which forms a gas-tight seal with the top of the sleeve 21 is suitable for use herein.

It will be noted that there is no vent hole in the cap 23, this requirement being taken care of by means of a construction which will now be described.

At one portion around the periphery of the expanded part 20, the metal is pressed inwardly to form a groove in which a relatively small tube 24 is inserted. The tube is brazed in position with the sleeve 21, so that the opening in the tube forms the only vent between the sleeve and portion 20. The upper end of the tube 24 is bent downwardly, as at 25, at approximately 45° angle, as shown in Figure 2. The portion 25 hugs one wall of the expanded portion 20 so as not to obstruct the nozzle of the fuel hose when the tank is being filled. The inner end of the part 25 has a pair of ears 26 bent over which form a partial obstruction at this end of the tube. Intermediate of the upper part of the portion 25 and the ears 26 the tube is contracted, as at 27, to form a check valve seat, and a ball 28 is loosely mounted in the drawing, are secured in the bottom half of within the tube 25 between the seat 27 and the ears 26.

The portion 25 being on a 45° angle and lying in a plane transverse to the car, it follows that the ball 28 will normally remain in position against the ears 26 by the force of gravity. The ears 26 only partially obstruct the tube so that normally there will be a vent through the tube to the atmosphere thereby allowing sufficient air to enter the tank to compensate for the fuel drawn therefrom. However, if the car rounds a curve with sufficient force to throw the fuel by centrifugal action outwardly and upwardly in the filler neck, then the same force will be sufficient to cause the ball 28 to roll up the incline 25 to the position shown by dotted lines 29 at which time it is held against the seat 27 and thereby closes the vent in the tube 25. The fuel is thus stopped from further movement and is in fact cushioned by the air pocket formed in the upper end of the tube 15.

Among the many advantages arising from the use of my improved device, it may be well to mention that laterally extending filler necks may be conveniently employed to fit even the widest automobile bodies and still the fuel tank proper may be concentrated at the center of the car to thereby maintain the center gravity of the car in a substantially uniform position.

Some changes may be made in the arrangement, construction and combination of the various parts of my improved device without departing from the spirit of my invention, and it is my intention to cover by my claims such changes as may reasonably be included within the scope thereof.

I claim as my invention:

1. In combination, a fuel tank adapted to extend transversely across a motor vehicle, a filler neck extending horizontally from one end of said tank, the outer end of said filler neck being bent upwardly, a cap secured to the upper end of said filler neck, which cap forms an air-tight closure therefor, a vent tube extending through the wall of the upper portion of said filler neck, said vent tube having a portion thereof which extends diagonally downwardly in a plane transverse to the vehicle, a check valve ball disposed in the diagonal portion of the vent tube, and a check valve seat formed in said diagonal portion in position above said ball, the angle of said diagonal portion being such that said ball will be forced by the centrifugal force generated as the vehicle rounds a curve in one direction to coact with said seat, for the purpose described.

2. In combination, a fuel tank adapted to extend transversely across a motor vehicle, a filler neck extending horizontally a substantial distance from one end of said tank, the outer end of said filler neck being bent upwardly to position above the top of said tank, a cap adapted to coact with the upper end of said filler neck so as to form a fluid-tight closure therefor, a vent tube extending through the wall of the upper portion of said filler neck, said vent tube having a portion thereof which extends diagonally downwardly in a plane transverse to the plane of the car, said diagonal portion having a ball check seat formed in the upper portion thereof, and a check ball loosely mounted in said diagonal portion in position beneath said seat, said diagonal portion extending at such angle that said ball check will coact with said seat due to the centrifugal force generated as the vehicle rounds a curve in one direction to thereby close said vent tube before sufficient centrifugal force has been generated to cause the fuel in the tank to flow outwardly and upwardly through the vent tube.

3. In combination, a fuel tank adapted to extend transversely across the rear portion of a motor vehicle, a tubular filler neck detachably secured in one end of said tank so as to extend horizontally therefrom a substantial distance, said filler neck having a portion extending vertically from the outer end thereof, a cap forming an airtight closure for the upper end of said filler neck, the upper end of said filler neck being expanded, a sleeve secured over the expanded end of said filler neck, and a cap detachably secured to the upper end of said sleeve, a vent tube extending downwardly between said sleeve and said expanded portion, said sleeve and expanded portion and tube being sealed so that said tube forms the only vent for said filler neck when the said cap is in position, the upper end of said vent tube being bent down over the upper end of said filler neck so as to extend diagonally downwardly inside of said expanded portion, and a ball check valve disposed in the inner end of said vent tube, said ball check operating by the centrifugal force generated when the vehicle rounds a curve in one direction to close said vent tube before the centrifugal force causes the fuel in the tank to flow outwardly through said vent tube.

CHARLES L. HOLM.